United States Patent
Khatwa et al.

(10) Patent No.: US 8,417,397 B2
(45) Date of Patent: Apr. 9, 2013

(54) VERTICAL PROFILE DISPLAY WITH VARIABLE DISPLAY BOUNDARIES

(75) Inventors: Ratan Khatwa, Sammamish, WA (US); Santosh Mathan, Seattle, WA (US); Olukayode Olofinboba, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 302 days.

(21) Appl. No.: 12/774,513

(22) Filed: May 5, 2010

(65) Prior Publication Data
US 2011/0276198 A1 Nov. 10, 2011

(51) Int. Cl.
G06F 7/70 (2006.01)
(52) U.S. Cl. .............................. 701/14; 701/3
(58) Field of Classification Search ............ 701/4–6, 701/3, 14
See application file for complete search history.

(56) References Cited

U.S. PATENT DOCUMENTS

| | | | |
|---|---|---|---|
| 3,875,379 A | 4/1975 | Vietor | |
| 5,077,673 A | 12/1991 | Brodegard et al. | |
| 5,574,647 A | 11/1996 | Liden | |
| 5,957,412 A | 9/1999 | Saint Upery et al. | |
| 6,148,259 A | 11/2000 | Hagelauer | |
| 6,433,729 B1 | 8/2002 | Staggs | |
| 6,690,298 B1 | 2/2004 | Barber et al. | |
| 6,720,891 B2 | 4/2004 | Chen et al. | |
| 6,799,114 B2 | 9/2004 | Etnyre | |
| 6,839,018 B2 | 1/2005 | Szeto et al. | |
| 6,876,906 B1 | 4/2005 | Zellers et al. | |
| 6,963,291 B2 | 11/2005 | Holforty et al. | |
| 7,366,591 B2 | 4/2008 | Hartmann et al. | |
| 7,367,526 B2 | 5/2008 | Baudry | |
| 7,375,678 B2 | 5/2008 | Feyereisen et al. | |
| 7,386,373 B1 | 6/2008 | Chen et al. | |
| 7,403,843 B2 | 7/2008 | Gremmert | |
| 7,453,375 B2 | 11/2008 | Chamas et al. | |
| 7,570,178 B1 | 8/2009 | Whalen et al. | |

(Continued)

FOREIGN PATENT DOCUMENTS

| | | |
|---|---|---|
| EP | 1752739 A2 | 2/2007 |
| EP | 1752739 A3 | 1/2008 |
| EP | 2345872 A2 | 7/2011 |

OTHER PUBLICATIONS

USPTO Office Action for U.S. Appl. No. 12/721,146; Notification Date Jan. 9, 2012.
EP Search Report, EP11 154 857.4, dated Apr. 11, 2012.

(Continued)

*Primary Examiner* — Hussein A. Elchanti
(74) *Attorney, Agent, or Firm* — Ingrassia Fisher & Lorenz, P.C.

(57) ABSTRACT

A display system includes instrumentation configured to obtain aircraft data comprising current flight status data of the host aircraft and current flight status data of neighboring aircraft located near the host aircraft. The system also includes a processor coupled to the instrumentation. The processor analyzes and filters the aircraft data, using lateral boundary criteria for the host aircraft, to identify a proper subset of the neighboring aircraft, and the processor generates image rendering display commands based upon the current flight status data of the host aircraft and based upon the current flight status data of neighboring aircraft included in the proper subset. A display element receives the image rendering display commands and, in response thereto, renders a vertical situation display that includes graphical representations of the host aircraft and each neighboring aircraft included the proper subset.

20 Claims, 8 Drawing Sheets

U.S. PATENT DOCUMENTS

| | | |
|---|---|---|
| 7,650,232 B1 | 1/2010 | Paielli |
| 7,746,343 B1 * | 6/2010 | Charaniya et al. ............ 345/428 |
| 7,747,382 B2 | 6/2010 | Small et al. |
| 7,877,197 B2 | 1/2011 | Lewis et al. |
| 7,961,135 B2 | 6/2011 | Smith et al. |
| 7,965,223 B1 | 6/2011 | McCusker |
| 8,271,152 B2 | 9/2012 | Singer et al. |
| 2002/0075171 A1 | 6/2002 | Kuntman et al. |
| 2002/0089432 A1 | 7/2002 | Staggs et al. |
| 2002/0133294 A1 | 9/2002 | Farmakis et al. |
| 2003/0006928 A1 * | 1/2003 | Szeto et al. ...................... 342/26 |
| 2006/0290562 A1 * | 12/2006 | Ehresman ....................... 342/41 |
| 2008/0266054 A1 | 10/2008 | Crank |
| 2008/0309518 A1 | 12/2008 | Aung |
| 2009/0024311 A1 | 1/2009 | Hess |
| 2009/0088972 A1 | 4/2009 | Bushnell |
| 2009/0231163 A1 | 9/2009 | He |
| 2009/0267800 A1 | 10/2009 | Hammack et al. |
| 2010/0023187 A1 * | 1/2010 | Gannon et al. .................... 701/7 |
| 2010/0070180 A1 | 3/2010 | Ridenour |
| 2010/0131121 A1 * | 5/2010 | Gerlock ............................ 701/2 |
| 2010/0152932 A1 * | 6/2010 | Das ................................. 701/14 |
| 2010/0286900 A1 | 11/2010 | Depape et al. |
| 2010/0292871 A1 * | 11/2010 | Schultz et al. .................... 701/3 |
| 2010/0305783 A1 | 12/2010 | Tucker et al. |
| 2010/0332054 A1 | 12/2010 | Brandao et al. |
| 2011/0006918 A1 | 1/2011 | Shafaat et al. |
| 2011/0066360 A1 | 3/2011 | Haissig |
| 2011/0066362 A1 | 3/2011 | He |
| 2011/0118981 A1 | 5/2011 | Chamlou |
| 2011/0187588 A1 | 8/2011 | Khatwa et al. |
| 2011/0224847 A1 | 9/2011 | Singer et al. |
| 2011/0231096 A1 | 9/2011 | Ridenour, II |
| 2011/0270472 A1 | 11/2011 | Shafaat et al. |
| 2011/0270473 A1 | 11/2011 | Reynolds et al. |
| 2011/0276198 A1 | 11/2011 | Khatwa et al. |
| 2011/0282568 A1 | 11/2011 | Khatwa et al. |
| 2011/0316857 A1 | 12/2011 | Pepitone et al. |

OTHER PUBLICATIONS

Federal Aviation Administration; NextGen Operator and Airport Enablers; Supplement to NextGen Investment for Operators and Airports, FAA's NextGen Implementation Plan, Mar. 2011.

Chartrand, R. C. et al.; Operational Improvements From Using the In-Trail Procedure in the North Atlantic Organized Track System, Oct. 2009.

Murdoch, J. L. et al.; Enhanced Oceanic Operations Human-In-The-Loop In-Trail Procedure Validation Simulation Study, NASA/TP-2008-215313, Jun. 2008.

EP Examination Report for EP 11 154 857.4, dated May 22, 2012.

USPTO Notice of Allowance for U.S. Appl. No. 12/721,146; notification date Jun. 7, 2012.

USPTO Office Action for U.S. Appl. No. 13/407,475; notification date Nov. 21, 2012.

* cited by examiner

VERTICAL PROFILE DISPLAY WITH VARIABLE DISPLAY BOUNDARIES

STATEMENT REGARDING FEDERALLY SPONSORED RESEARCH OR DEVELOPMENT

The disclosed invention was made with United States Government support under contract number MOA DTFAWA-09-A-00001, Mod 0003 (awarded by the Federal Aviation Authority). The United States Government has certain rights in the disclosed invention.

TECHNICAL FIELD

Embodiments of the subject matter described herein relate generally to avionics systems such as flight display systems. More particularly, embodiments of the subject matter relate to a vertical profile display for a host aircraft.

BACKGROUND

The in-trail procedure (ITP) is a protocol followed by an aircraft that desires to change its current flight level to a new flight level by descending or climbing in front of or behind one or more potentially blocking aircraft that are flying at an intervening flight level. In accordance with the ITP, certain conditions must be satisfied before the flight crew member issues a request for clearance to proceed with the flight level change. Whether or not the conditions are satisfied will depend on a number of dynamically changing factors associated with the host aircraft and other aircraft, such as the current geographic position of the aircraft, the current speed of the aircraft, the current heading of the aircraft, the desired new flight level, and the current flight level.

Modern flight deck instrumentation might include a vertical profile display or a vertical situation display (VSD) that provides a two-dimensional representation of an aircraft, the aircraft vertical flight plan, and neighboring aircraft. VSDs typically include a number of parameters and visual indicators that enable the pilot to form a quick mental picture of the vertical situation of the host aircraft. For example, VSDs may include displays of an aircraft symbol, the aircraft altitude, the vertical flight plan, and terrain. Thus, a member of the aircraft flight crew can obtain information related to the vertical situation of the aircraft relative to the terrain with a simple glance at the VSD.

A VSD could be used to identify the vertical position of potentially blocking aircraft for purposes of the ITP. Even if a VSD is deployed, however, the flight crew member will still need to mentally interpret the traffic situation and/or perform manual calculations related to the designation of potentially blocking aircraft and related to the determination of whether the conditions exist requiring the ITP protocol be used for a desired flight level change. Conventional VSDs display all air traffic within some predetermined maximum range relative to the host aircraft. Accordingly, a conventional VSD might become cluttered with many graphical representations of neighboring aircraft, whether or not such neighboring aircraft are relevant for purposes of the ITP.

BRIEF SUMMARY

A method for displaying aircraft traffic information on a display element of a host aircraft is provided. The method obtains current flight status data of the host aircraft and current flight status data of neighboring aircraft located within a designated range relative to the host aircraft. The method also obtains a display filter boundary relative to the host aircraft, where the display filter boundary resides within the designated range. The method continues by analyzing the current flight status data of the neighboring aircraft located within the designated range to identify neighboring aircraft located within the display filter boundary. The method generates image rendering display commands for a VSD, based upon the current flight status data of the host aircraft and the current flight status data of the neighboring aircraft located within the display filter boundary. The VSD includes graphical representations of the host aircraft and the neighboring aircraft located within the display filter boundary, and the VSD is devoid of graphical representations of any neighboring aircraft located outside the display filter boundary. The VSD is rendered on the display element of the host aircraft.

Also provided is a display system for a host aircraft. The display system includes: instrumentation configured to obtain aircraft data comprising current flight status data of the host aircraft and current flight status data of neighboring aircraft located near the host aircraft; a processor coupled to the instrumentation; and a display element coupled to the processor. The processor is configured to process and filter the aircraft data, using lateral boundary criteria for the host aircraft, to identify a proper subset of the neighboring aircraft. The processor is also configured to generate image rendering display commands based upon the current flight status data of the host aircraft and based upon the current flight status data of neighboring aircraft included in the proper subset. The display element is configured to receive the image rendering display commands and, in response thereto, to render a VSD that includes graphical representations of the host aircraft and each neighboring aircraft included the proper subset.

Another method for displaying aircraft traffic information on a display element of a host aircraft is also provided. This method begins by obtaining current flight status data of the host aircraft and current flight status data of neighboring aircraft located near the host aircraft. The method continues by receiving a user command that indicates an activation status of a lateral filter display mode. When the user command indicates activation of the lateral filter display mode, the current flight status data of the neighboring aircraft is filtered, using lateral filtering criteria for the host aircraft, to identify a proper subset of the neighboring aircraft, and a filtered VSD is rendered with graphical representations of those neighboring aircraft included in the proper subset. When the user command indicates deactivation of the lateral filter display mode, an unfiltered VSD is rendered with graphical representations of all neighboring aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter described herein relates to a vertical profile display (also referred to as a vertical situation display or VSD) that is suitable for use onboard an aircraft. The VSD is generated and rendered such that the amount of displayed neighboring aircraft is "filtered" to reduce display clutter. The neighboring aircraft are filtered in accordance with pre-defined, user-entered, or dynamically calculated boundaries that are measured relative to the host aircraft. In contrast, traditional VSD deployments include a fixed lateral width for the vertical presentation, i.e., a fixed volume of airspace that is considered for display of traffic targets on the VSD. For certain flights (e.g., oceanic operations) it may be advantageous for the flight crew to vary the lateral swath width of the VSD, depending on a number of factors such as traffic density, geometry of the track system, etc. For example, for closely spaced narrow tracks that are heavily congested with traffic it may be advantageous for the flight crew to de-clutter the VSD by manually selecting a narrower lateral display width.

In practice, a VSD having the features and characteristics described herein may be used in a normal navigation mode, an ITP mode, or both. In the normal navigation mode, the distance between the host aircraft and neighboring aircraft is expressed in a traditional manner, e.g., conventional range in nautical miles. In the ITP mode, however, the distance between the host aircraft and neighboring aircraft is expressed using "ITP distance" or some other defined units that are suitable for purposes of the ITP.

As mentioned above, although not always required, the techniques and technologies described here are suitable for use by aircraft using the ITP in an oceanic (or other) track system. For example, the techniques and technologies presented here could be used in connection with the ITP as defined and explained in *Operational Improvements From Using the In-Trail Procedure in the North Atlantic Organized Track System*, by Ryan C. Chartrand et al., National Aeronautics and Space Administration (October 2009) (hereinafter referred to as the "NASA Document"). The relevant portions of the NASA Document are incorporated by reference herein.

The NASA Document specifies that the host aircraft and any neighboring aircraft of interest (i.e., a potentially blocking aircraft) must be "same direction" aircraft in order for an ITP flight level change to be requested. In this regard, "same direction" tracks are intersecting tracks (or portions thereof) having an angular difference of less than 45 degrees. The ITP is a protocol that can be followed when an aircraft seeks to change its flight level to a new flight level in the presence of a potentially blocking aircraft located at an intervening flight level. According to the NASA Document, the "ITP is intended to enable altitude changes that are otherwise blocked when aircraft are spaced at less than current separation standards at altitudes between the current and desired altitudes of a requesting aircraft." The ITP specifies some minimum separation between aircraft at the current and requested flight levels, to ensure safe altitude changes. Moreover, the ITP specifies certain criteria that must be satisfied before the host aircraft can issue a request for ITP flight level change (such requests are issued to Air Traffic Control (ATC)). Although different criteria could be utilized by an embodiment of the subject matter described here, the NASA Document indicates the following ITP initiation criteria, where at least one of two conditions must be met: (1) if the ITP distance to a reference aircraft is greater than or equal to 15 nautical miles, then the groundspeed differential between the two aircraft must be less than or equal to 20 knots; or (2) if the ITP distance to a reference aircraft is greater than or equal to 20 nautical miles, then the groundspeed differential between the two aircraft must be less than or equal to 30 knots.

The NASA Document defines the ITP distance as "the difference in distance to a common point along each aircraft's track." For purposes of the VSD described herein, the ITP distance represents one appropriate measure of distance between the host aircraft and neighboring aircraft (which may or may not be "reference aircraft" as defined by the NASA Document). Depending upon the particular embodiment, other distance metrics, distance measures, or relative spacing metrics could be used with VSDs. For instance, the system could contemplate linear distance, time, aircraft acceleration, relative speed, closing rate, and/or other measureable or computable values that are dependent on the current geographic position, speed, acceleration, heading, attitude, or other operating status of the aircraft.

Figure 1:
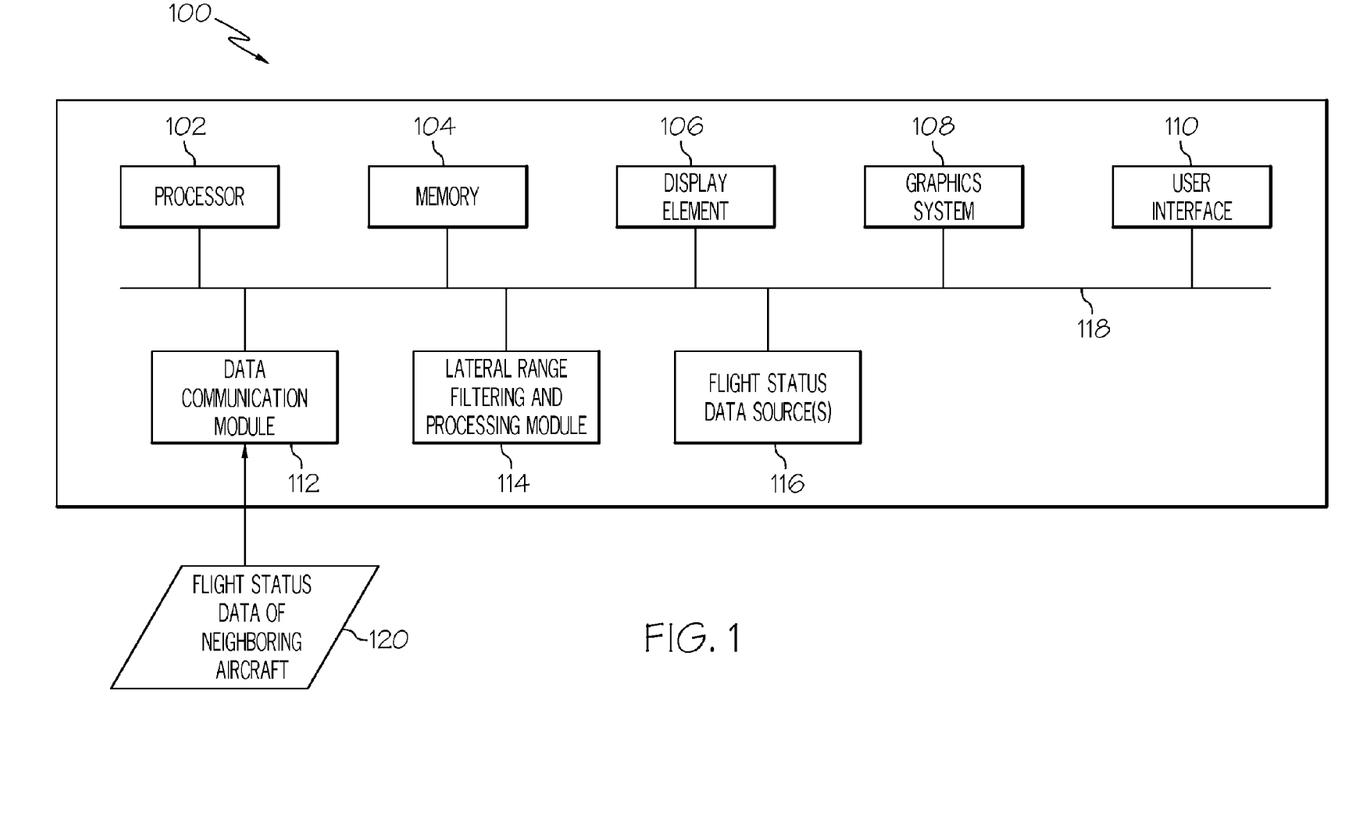
FIG. 1 is a schematic representation of an exemplary embodiment of a flight deck display system.

A VSD having the features and characteristics described in more detail below can be generated using a suitably configured onboard system, such as a flight deck display system. In this regard, FIG. 1 is a schematic representation of an exemplary embodiment of a flight deck display system 100 that is suitable for use with a vehicle such as an aircraft. In exemplary embodiments, the display system 100 is located onboard the host aircraft, i.e., the various components and elements of the display system 100 reside within the host aircraft, are carried by the host aircraft, or are attached to the host aircraft. The illustrated embodiment of the display system 100 includes, without limitation: at least one processor 102; an appropriate amount of memory 104; a display element 106; a graphics system 108; a user interface 110; a data communication module 112; a lateral range filtering and processing module 114; and at least one source of flight status data 116. These elements of the display system 100 may be coupled together by a suitable interconnection architecture 118 that accommodates data communication, the transmission of control or command signals, and/or the delivery of operating power within the display system 100. It should be understood that FIG. 1 is a simplified representation of the display system 100 that will be used for purposes of explanation and ease of description, and that FIG. 1 is not intended to limit the application or scope of the subject matter in any way. In practice, the display system 100 and the host aircraft will include other devices and components for providing additional functions and features, as will be appreciated in the art. Furthermore, although FIG. 1 depicts the display system 100 as a single unit, the individual elements and components of the display system 100 could be implemented in a distributed manner using any number of physically distinct pieces of hardware or equipment.

The processor 102 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor 102 and/or the lateral range filtering and processing module 114 obtains, processes, and "filters" aircraft data, which includes current flight status data (of the host aircraft and one or more neighboring aircraft), to identify those neighboring aircraft that are located within certain lateral boundaries relative to the host aircraft, for purposes of generating a filtered VSD that has less graphical clutter.

The memory 104 may be realized as RAM memory, flash memory, EPROM memory, EEPROM memory, registers, a hard disk, a removable disk, a CD-ROM, or any other form of storage medium known in the art. In this regard, the memory 104 can be coupled to the processor 102 such that the processor 102 can read information from, and write information to, the memory 104. In the alternative, the memory 104 may be integral to the processor 102. As an example, the processor 102 and the memory 104 may reside in an ASIC. In practice, a functional or logical module/component of the display system 100 might be realized using program code that is maintained in the memory 104. For example, the graphics system 108, the data communication module 112, or the lateral range filtering and processing module 114 may have associated software program components that are stored in the memory 104. Moreover, the memory 104 can be used to store data utilized to support the operation of the display system 100, as will become apparent from the following description.

In an exemplary embodiment, the display element 106 is coupled to the graphics system 108. The graphics system 108 is coupled to the processor 102 such that the processor 102 and the graphics system 108 cooperate to display, render, or otherwise convey one or more graphical representations, synthetic displays, graphical icons, visual symbology, or images associated with operation of the host aircraft on the display element 106, as described in greater detail below. An embodiment of the display system 100 may utilize existing graphics processing techniques and technologies in conjunction with the graphics system 108. For example, the graphics system 108 may be suitably configured to support well known graphics technologies such as, without limitation, VGA, SVGA, UVGA, or the like.

In an exemplary embodiment, the display element 106 is realized as an electronic display configured to graphically display flight information or other data associated with operation of the host aircraft under control of the graphics system 108. The display element 106 could also be implemented as a virtual display of the type used with head up display technology. Moreover, the display element 106 could be integrated in equipment worn or carried by the user, e.g., a display mounted to eyewear, headwear, or the like. In practice, the processor 102 and/or the graphics system 108 produces image rendering display commands that are received by the display element 106 for purposes of rendering VSDs. The display element 106 is usually located within a cockpit of the host aircraft. It will be appreciated that although FIG. 1 shows a single display element 106, in practice, additional display devices may be present onboard the host aircraft.

The illustrated embodiment of the display system 100 includes a user interface 110, which is suitably configured to receive input from a user (e.g., a pilot) and, in response to user-entered data, supply appropriate command signals to the processor 102. The user interface 110 may be any one, or any combination, of various known user interface devices or technologies, including, but not limited to: a cursor control device such as a mouse, a trackball, or joystick; a keyboard; buttons; switches; or knobs. Moreover, the user interface 110 may cooperate with the display element 106 and the graphics system 108 to provide a graphical user interface. In other words, the user interface 110 could be implemented as a graphical user interface rendered on the display element 106.

In certain embodiments, the display element 106 implements touch-sensitive technology for purposes of the user interface 110. Thus, a user can manipulate the user interface 110 by moving a cursor symbol rendered on the display element 106 and/or by physically interacting with the display element 106 itself, and the user may use a keyboard to, among other things, input textual data. For example, the user could manipulate the user interface 110 to enter a desired or requested new flight level into the display system 100, to enter lateral boundary values and/or other lateral boundary criteria associated with the rendering of a VSD, and to select VSD presentation modes.

In an exemplary embodiment, the data communication module 112 is suitably configured to support data communication between the host aircraft and one or more remote systems. More specifically, the data communication module 112 is used to receive current flight status data 120 of other aircraft that are near the host aircraft. In this regard, the data communication module 112 represents instrumentation that obtains aircraft data used by the display system 100. In particular embodiments, the data communication module 112 is implemented as an aircraft-to-aircraft data communication module that receives flight status data from an aircraft other than the host aircraft. For example, the data communication module 112 may be configured for compatibility with Automatic Dependant Surveillance-Broadcast (ADS-B) technology, with Traffic and Collision Avoidance System (TCAS) technology, and/or with similar technologies. In other embodiments the data communication module 112 may also be compatible with Traffic Information Service-Broadcast (TIS-B) technology.

The flight status data 120 of the neighboring aircraft may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 100 is suitably designed to process the flight status data 120 in the manner described in more detail herein. In particular, the display system 100 can use the flight status data 120 when rendering a VSD on the display element 106.

The lateral range filtering and processing module 114 is configured to perform various operations, calculations, data analysis, and other functions associated with the generation of VSDs. For example, the lateral range filtering and processing module 114 may be suitably configured to calculate or otherwise obtain lateral boundaries or lateral boundary criteria that influences the manner in which neighboring aircraft are rendered on the VSD. In certain embodiments, the lateral range filtering and processing module 114 may be disabled or deactivated (by the user or automatically) if so desired such that the VSD includes graphical representations of all of the neighboring aircraft located within a designated or selected range relative to the host aircraft.

In operation, the display system 100 also processes the current flight status data of the host aircraft. In this regard, the sources of flight status data 116 generate, measure, and/or provide different types of data related to the operational status of the host aircraft, the environment in which the host aircraft is operating, flight parameters, and the like. In this regard, the sources of flight status data 116 represent instrumentation that obtains aircraft data used by the display system 100. In practice, the sources of flight status data 116 may be realized using line replaceable units (LRUs), transducers, accelerometers, instruments, sensors, and other well known devices. The data provided by the sources of flight status data 116 may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 100 is suitably designed to process data obtained from the sources of flight status data 116 in the manner described in more detail herein. In particular, the display system 100 can use the flight status data of the host aircraft when rendering VSDs.

Figure 2:
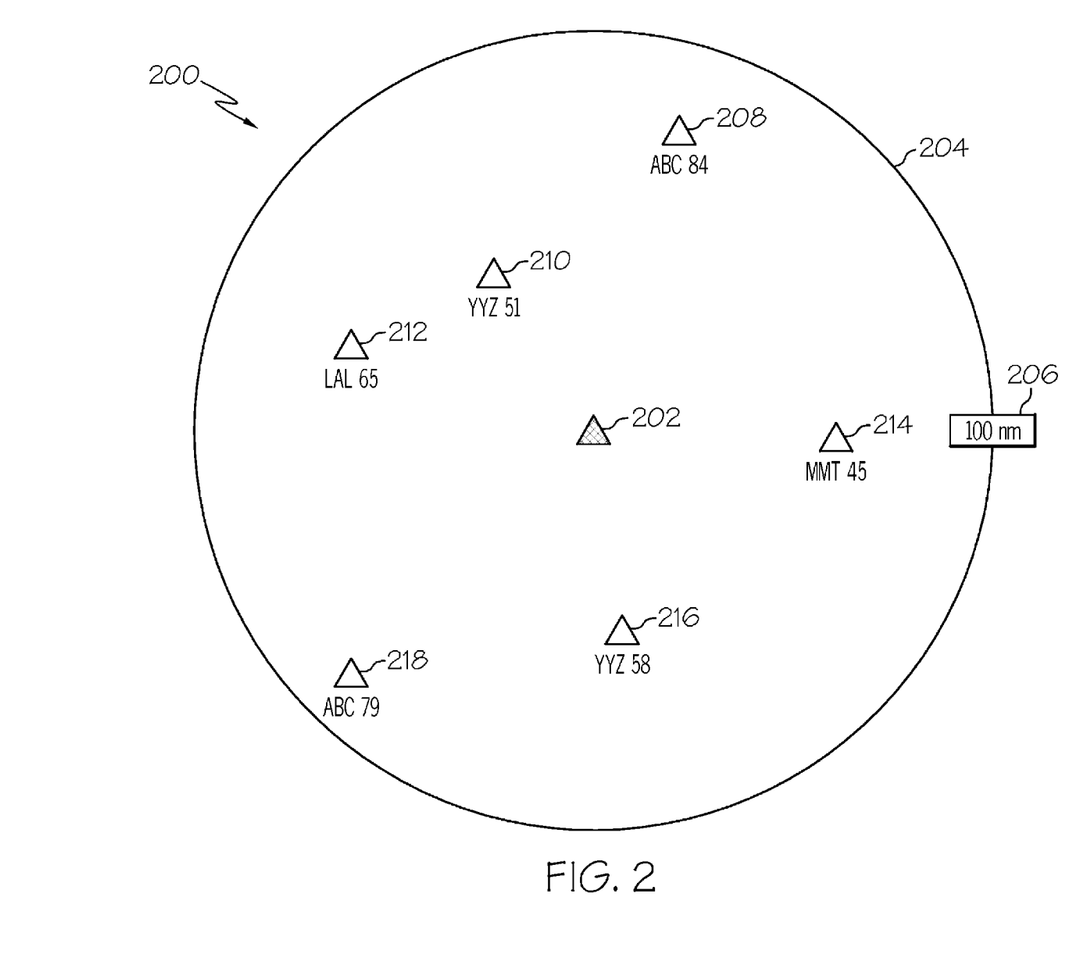
FIG. 2 is a schematic representation of an exemplary plan view display that depicts a host aircraft and surrounding aircraft traffic.
Figure 3:
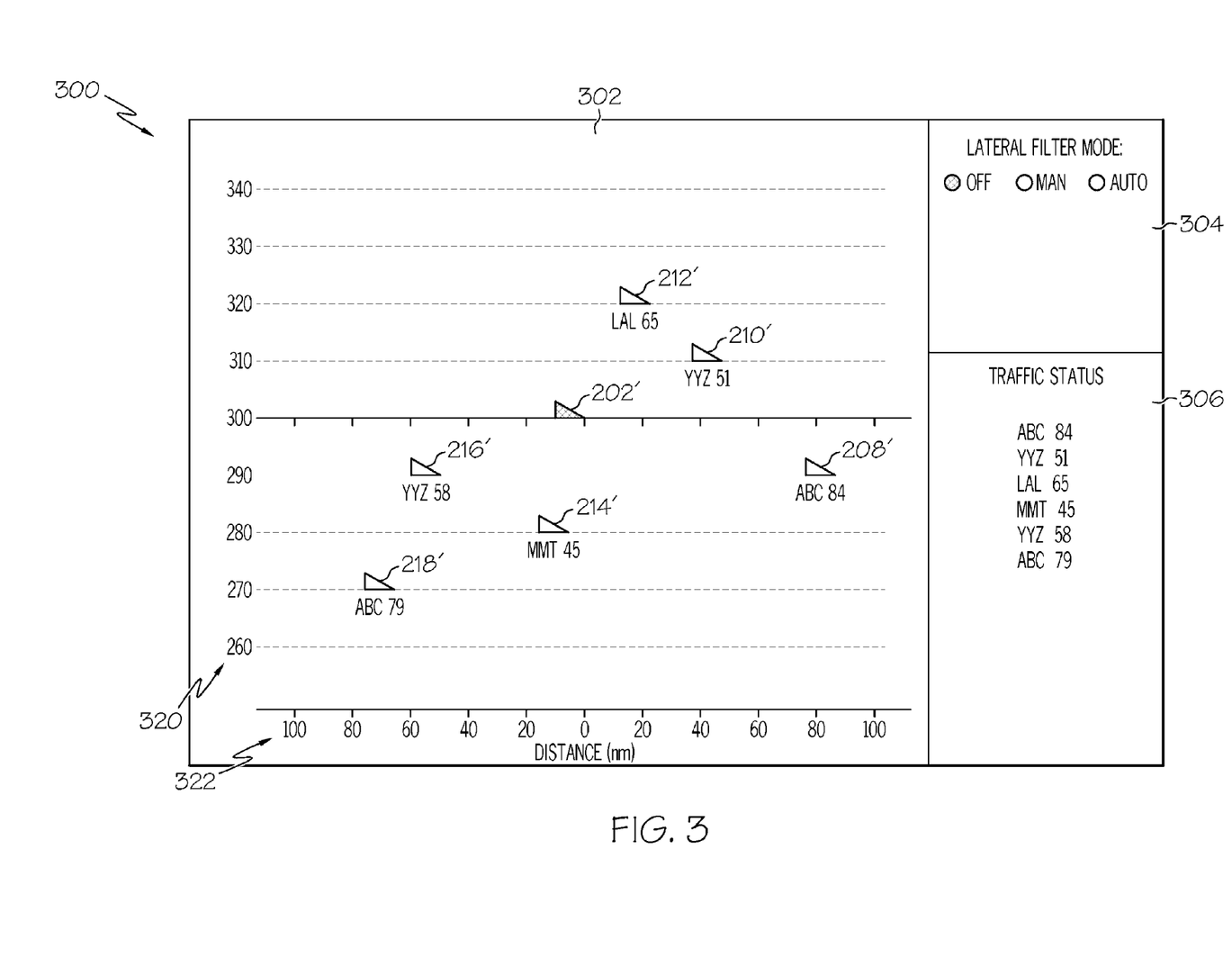
FIG. 3 is a schematic representation of an exemplary VSD that corresponds to the plan view display shown in FIG. 2.

As mentioned previously, a VSD provides a graphical representation of the host aircraft and neighboring aircraft using a side or vertical profile perspective. The display system 100 may also be suitably configured to generate and render plan view displays of the air traffic near the host aircraft. In this regard, FIG. 2 is a schematic representation of an exemplary plan view display 200 that depicts a host aircraft and surrounding aircraft traffic, and FIG. 3 is a schematic representation of an exemplary VSD 300 that corresponds to the plan view display 200. The plan view display 200 and the VSD 300 represent snapshots of dynamic displays taken at a particular moment in time.

Referring to FIG. 2, the plan view display 200 corresponds to a top-down view of the airspace near the host aircraft. The illustrated embodiment of the plan view display 200 generally includes, without limitation, graphical representations of the following items: the host aircraft 202; a range circle 204; a range marker 206; and a plurality of neighboring aircraft 208, 210, 212, 214, 216, 218. The plan view display 200 also includes identifiers or labels for each neighboring aircraft. For example, each neighboring aircraft could be identified by carrier and tail number. The range marker 206 includes alphanumeric indicia of a designated range (100 nautical miles for this example) relative to the host aircraft 202. Notably, the plan view display 200 includes graphical representations of all the neighboring aircraft located within the designated range, assuming that the system has knowledge of all those neighboring aircraft. In accordance with traditional plan view display technology, the graphical representation of the host aircraft 202 remains in a fixed position on the plan view display 200.

Referring to FIG. 3, the VSD 300 corresponds to a side view of the airspace near the host aircraft. This exemplary VSD 300 generally includes a main display area 302, a data entry and notification area 304, and a traffic status area 306. The main display area 302 contains graphical representations of the aircraft. The data entry and notification area 304 may be dynamic in nature such that a variety of notifications, data entry fields, information, and graphical items can be displayed at different times to accommodate changing conditions, user commands, display modes, and the like. This particular embodiment includes graphical "radio buttons" in the data entry and notification area 304—these radio buttons indicate the current lateral filter display mode of the VSD 300 (OFF indicates that the lateral filter display mode is not active; MAN indicates that the manual lateral filter display mode is activated; and AUTO indicates that the automatic lateral filter display mode is activated). These different display modes are described in more detail below. Notably, the lateral filter display mode is deactivated for the VSD 300 depicted in FIG. 3. Accordingly, the main display area 302 includes graphical representations of all the neighboring aircraft located within the designated range (100 nautical miles), which is consistent with the plan view display 200. The traffic status area 306 is utilized to list the neighboring aircraft that appear in the main display area 302, using any appropriate identifier or nomenclature. This example identifies the other aircraft by carrier and tail number (ABC 84, YYZ 51, LAL 65, MMT45, YYZ 58, and ABC 79). In some implementations, the traffic status area 306 can be used to provide detailed information about a single aircraft that has been selected by the user. For example, if the user selects the LAL 65 aircraft, then data associated with that aircraft (such as altitude, ground speed, ITP distance, and the like) can be presented in the traffic status area 306.

The illustrated embodiment of the main display area 302 of the VSD 300 generally includes, without limitation, graphical representations of the following items: an altitude scale 320 for the host aircraft and the other aircraft; a lateral distance scale 322 for the host aircraft and the other aircraft (which may be expressed in ITP distance or "standard" (range) distance using nautical miles as the unit of measurement); the host aircraft 202; and neighboring aircraft 208', 210', 212', 214', 216', 218'. The prime notation is used for numbering consistency with FIG. 2—the neighboring aircraft depicted in the VSD 300 are intended to represent their counterpart neighboring aircraft in the plan view display 200.

The altitude (or flight level) scale 320 may include alphanumeric indicia of altitude values in any convenient scale (in FIG. 3, the altitude scale 320 includes numerical values expressed in hundreds of feet, in increments of one thousand feet). In this embodiment, the altitude scale 320 is rendered as a scrollable tape such that the host aircraft 202' is always rendered at the same vertical position on the VSD 300. At the time depicted in FIG. 3, the current flight level of the host aircraft 202' is 30,000 feet. The lateral distance scale 322 may include alphanumeric indicia of distance values in any convenient scale (in FIG. 3, the lateral distance scale 322 includes numerical values that represent distance relative to the host aircraft 202', in increments of twenty nautical miles). In this embodiment, the lateral distance scale 322 has a zero reference point that corresponds to the current position of the host aircraft. In other words, the graphical representation of the host aircraft 202' is aligned with the zero lateral distance mark on the lateral distance scale 322. Consequently, the host aircraft 202' and the lateral distance scale 322 are rendered in fixed positions on the VSD 300. In contrast, during operation, the altitude scale 320 and the neighboring aircraft 208', 210', 212', 214', 216', 218' can be rendered in a dynamic manner that reflects the changing flight conditions and aircraft positions.

Notably, the graphical representations of the host aircraft 202' and the neighboring aircraft 208', 210', 212', 214', 216', 218' are positioned in the main display area 302 in accordance with the current flight status data of the host aircraft and in accordance with the current flight data of the neighboring aircraft (which may be received by the host aircraft using, for example, ADS-B technology). The graphical representations of the neighboring aircraft 208', 210', 212', 214', 216', 218' are positioned on the main display area 302 in a manner that indicates the actual respective altitudes of the neighboring aircraft relative to the host aircraft, and in a manner that indicates the actual distance of interest (e.g., a standard distance measure, the ITP distance, or other suitable distance metric) between the other aircraft and the host aircraft. Consequently, the current distance and vertical separation between the host aircraft and the nearby aircraft can be quickly and easily determined from the VSD 300.

In certain embodiments, the main display area 302 includes graphical identifiers or labels for the displayed aircraft. For this particular example, all displayed aircraft (other than the host aircraft 202') are rendered with their corresponding alphanumeric carrier and tail identifiers. Thus, the neighboring aircraft 208' is rendered with the text "ABC 84", the neighboring aircraft 210' is rendered with the text "YYZ 51", the neighboring aircraft 212' is rendered with the text "LAL 65", the neighboring aircraft 214' is rendered with the text "MMT 45", the neighboring aircraft 216' is rendered with the text "YYZ 58", and the neighboring aircraft 218' is rendered with the text "ABC 79". The airline flight number may also be used to identify the displayed aircraft. In particular embodiments, the main display area 302 also includes graphical indicia of certain flight status information for neighboring or reference aircraft. For example, a reference aircraft could be rendered with text that indicates its current ITP distance relative to the host aircraft. As another example, a neighboring aircraft could be rendered with text that indicates its airspeed relative to the host aircraft.

FIG. 3 depicts an exemplary display screen that appears when display filtering is deactivated. Consequently, the VSD 300 by default will show graphical representations of all the neighboring aircraft located within the designated range (100 nautical miles for this example, as shown in FIG. 2). For simplicity, FIG. 3 depicts only six neighboring aircraft and, therefore, the VSD 300 remains relatively uncluttered and easily readable. If, however, a large number of neighboring aircraft are present within the designated range, then the VSD 300 could become difficult to interpret, especially if graphical representations of aircraft are rendered very close to one another and/or overlapping one another. In such situations, the display system 100 or the user could activate a display filtering mode to hide or otherwise remove some of the aircraft icons from the VSD 300.

Figure 4:
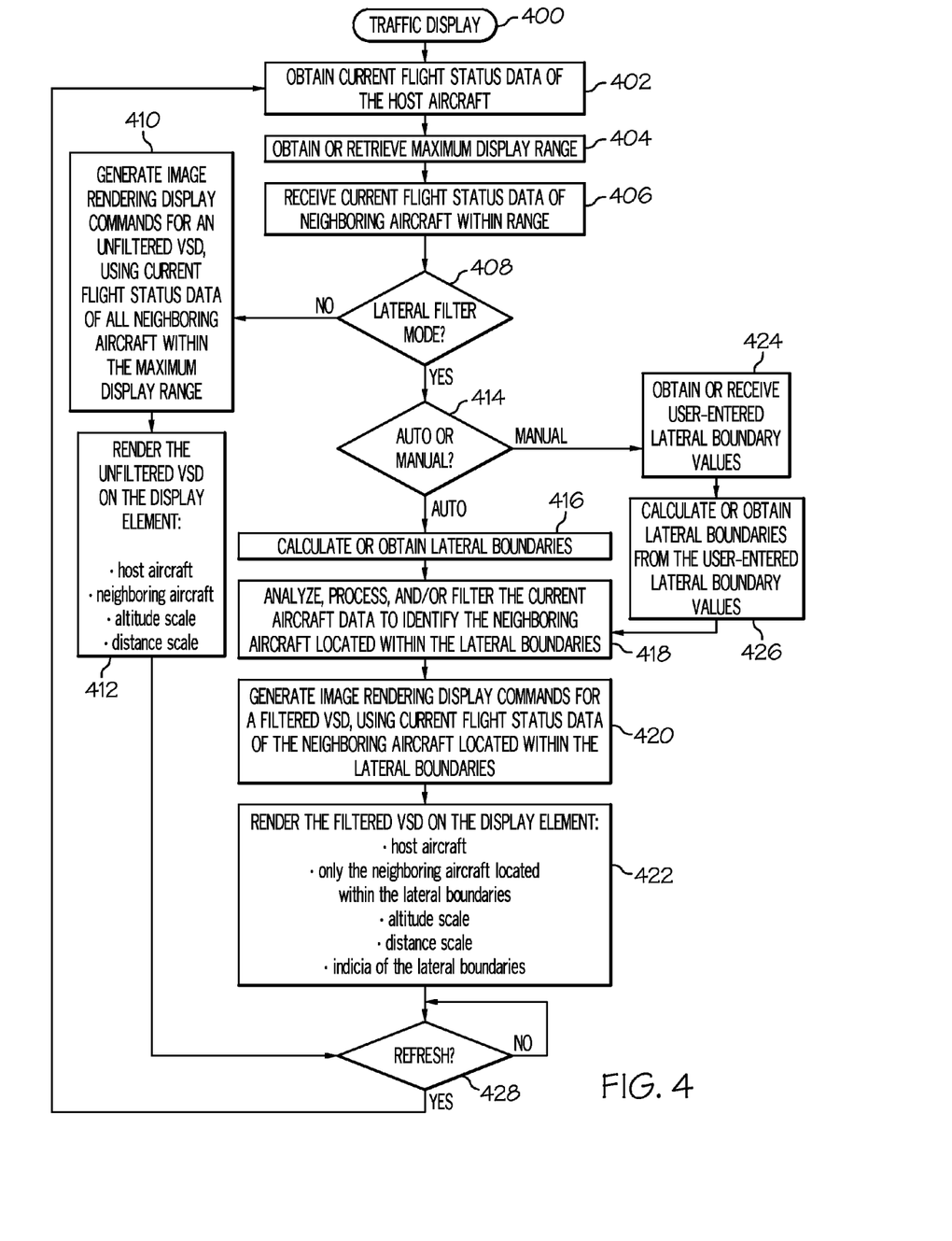
FIG. 4 is a flow chart that illustrates an exemplary embodiment of a traffic display process suitable for use with a flight deck display system.

FIG. 4 is a flow chart that illustrates an exemplary embodiment of a traffic display process 400 suitable for use with a flight deck display system such as the display system 100. Process 400 represents one implementation of a method for displaying aircraft traffic information (in the form of a VSD) on an onboard display element of a host aircraft. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system, e.g., a processor or processing module, a graphics module, a display element, or a data communication component. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

The embodiment of the process 400 described here utilizes a lateral boundary filtering scheme wherein neighboring aircraft that are located more than a specified lateral distance (to the port and/or starboard side of the host aircraft) are disregarded for purposes of VSD rendering such that those outlying aircraft are not displayed on the VSD. As used here, "lateral distance" is defined as the distance measured from the aircraft's longitudinal axis (the distance to the port or starboard of the longitudinal axis. It should be appreciated that alternate embodiments could employ different filtering schemes that are based upon one or more suitable metrics, including distance measures, time measures, acceleration, velocity, wind speed, etc. For example, the process 400 could consider a filtering boundary that is defined by an area or a volume around the host aircraft, e.g., a spherical or tubular boundary surrounding the host aircraft. As another example, the process 400 could consider a filtering boundary that contemplates the "point-to-point" distance between the host aircraft and each neighboring aircraft. In some implementations, the system could also define a user-variable altitude band (altitude filter) around the host aircraft, e.g., 4,000 feet above and below the current altitude of the host aircraft. As yet another example, the process 400 could limit the number of aircraft that can be processed and/or stored in memory, such that only the N closest aircraft will be considered (where N is the maximum number of allowable aircraft, e.g., two hundred). In practice, the display system may support a plurality of different display filtering schemes, and the particular scheme used at any given time could be selected (by the user or automatically in response to the satisfaction of certain predefined criteria).

During operation of the host aircraft, process 400 can be performed in a virtually continuous manner at a relatively high refresh rate. For example, an iteration of process 400 could be performed once every two seconds (or less) such that the VDS will be updated in real-time or substantially real time in a dynamic manner. This particular embodiment of process 400 begins by obtaining the current flight status data of the host aircraft (task 402). The process 400 may also obtain or retrieve a designated, desired, or maximum display range for the VSD (task 404). In practice, this designated display range may be limited by the data communication capabilities of the host aircraft instrumentation. For the example described above for the VSD 300, the designated maximum display range is 100 nautical miles, although other embodiments could use a different maximum selectable range (e.g., 200 nautical miles). The designated maximum display range for the VSD could represent a lateral range measured from the port and starboard sides of the host aircraft, a spherical (or any volumetric) range measured from the host aircraft, or the like. The following description assumes that the designated range represents a lateral range relative to the host aircraft. In certain embodiments, the designated maximum display range for the VSD is predetermined and fixed. In other embodiments, the designated maximum display range is variable. In this regard, the display system could be suitably configured to accommodate user selectable and/or user-entered maximum display ranges. In yet other embodiments, the designated maximum display range is dynamically determined in response to current operating conditions and status of the host aircraft instrumentation (and/or the neighboring aircraft instrumentation).

The process 400 also receives or otherwise obtains the current flight status data of one or more other aircraft near the host aircraft (task 406). For this particular embodiment, task 406 obtains the current flight status data of neighboring aircraft located within the designated display range. In practice, the process 400 could collect additional aircraft data associated with neighboring aircraft located outside the designated display range, and thereafter discard or ignore that data if so desired. In preferred embodiments, task 406 is performed using an appropriate aircraft-to-aircraft data communication technology and related subsystem components located onboard the host aircraft. This enables the host aircraft to receive the current flight status data of the neighboring aircraft directly from those aircraft. Alternatively, the host aircraft could receive this information from a ground-based system. In yet other embodiments, aircraft-to-ground technology could be utilized (for example, data for surrounding aircraft is passed to the host aircraft via a data link to a ground facility using TIS-B).

The display system may allow the user to selectively activate the lateral filter display mode. As described above with reference to the VSD 300, the data entry and notification area 304 includes selectable buttons that enable the user to turn the lateral filter display off, select a manual filtering mode, and select an automatic filtering mode. In other embodiments, user-entered selections can be obtained using other user interface mechanisms. For this example, if the user selects the OFF button, then the display system will receive an appropriate user command that indicates a deactivation status of the lateral filter display mode. When the lateral filter mode is deactivated (query task 408), the display system generates appropriate image rendering display commands for an unfiltered VSD (task 410). Notably, these image rendering display commands will be generated based upon the current flight status data of the host aircraft and the current flight status data of all the neighboring aircraft located within the maximum display range (and also subject to any limitations of the host aircraft traffic computer).

The process 400 continues by generating and rendering an appropriate unfiltered VSD on an onboard display element of the host aircraft (task 412). The visual characteristics and elements of this unfiltered VSD will be responsive or otherwise influenced by the image rendering display commands generated during task 410. The unfiltered VSD will include a number of graphical features, visual elements, and graphical representations that are intended for viewing by the pilot and/or other flight crew members. For example, the unfiltered VSD might include, without limitation, graphical representations of: the host aircraft; the neighboring aircraft; an altitude or flight level scale; and a lateral distance scale (as described above for FIG. 3). Notably, certain graphical characteristics of the VSD will be determined by or otherwise influenced by the current flight status data of the host aircraft and the current flight status data of the neighboring aircraft.

Referring back to query task 408, if a lateral filter display mode is activated, then the process 400 checks whether automatic or manual filtering has been selected (query task 414). If automatic filtering is enabled, then the process 400 automatically calculates, obtains, or retrieves lateral boundaries, a display filter boundary, or some other lateral boundary criteria to be used for rendering a filtered VSD (task 416). For this example, task 416 calculates, obtains, or retrieves lateral boundaries relative to the host aircraft. These lateral boundaries may be predetermined and stored in memory as fixed values, or they may be calculated as needed based upon current operating conditions. In this regard, the lateral boundaries could be calculated as a function of the maximum lateral range, as a function of the displayed or selected horizontal distance scale, or the like. For example, the lateral boundaries may be calculated as a percentage of the designated maximum range. As another example, one predetermined lateral boundary value could be used when the displayed maximum lateral range is greater than a threshold distance, and a different predetermined lateral boundary value could be used when the displayed maximum lateral range is less than the threshold distance. Moreover, different lateral boundary calculation schemes could be utilized at different times, under different operating conditions, etc. For example, a practical embodiment might utilize the following scheme: if the maximum lateral display range displayed is less than 100 nautical miles, then the VSD will show neighboring aircraft located within a lateral distance of 15 nautical miles; and if the maximum lateral display range displayed is greater than or equal to 100 nautical miles, then the VSD will show neighboring aircraft located within a lateral distance that is twenty percent of the maximum lateral display range. In any event, the lateral boundary is less than the displayed maximum lateral range, in an embodiment.

After the lateral boundaries have been automatically calculated or otherwise obtained, the process 400 may analyze, process, and/or filter the current aircraft data (e.g., the current flight status data of the neighboring aircraft and the host aircraft) to identify those neighboring aircraft that are located within the lateral boundaries and any vertical boundaries such as those defined by an altitude filter (task 418). Assuming that at least one of the neighboring aircraft resides within the lateral and vertical boundaries, task 418 determines a proper subset of the overall set of neighboring aircraft (i.e., some but not all of the neighboring aircraft located within the maximum display range). In connection with the execution of task 418, the display system may analyze the status of each neighboring aircraft located within the maximum display range, and compare that status against the particular display filtering criteria. For example, for each neighboring aircraft, the display system could calculate the current lateral distance between the host aircraft and the given neighboring aircraft, and then compare the calculated lateral distance to the respective lateral boundary (port or starboard side). If the calculated lateral distance indicates that the neighboring aircraft is positioned inside the lateral boundaries, then the display system can mark or flag that neighboring aircraft as a member of the subset to be displayed on the VSD. If the calculated lateral distance indicates that the neighboring aircraft is positioned outside the lateral boundaries, then the display system can mark or flag that neighboring aircraft as one that should not be displayed on the VSD. The same general procedure can be followed for any upper and lower vertical boundaries.

Next, the display system generates appropriate image rendering display commands for a filtered VSD (task 420). Notably, these image rendering display commands will be generated based upon the current flight status data of the host aircraft and the current flight status data of the neighboring aircraft located within the lateral and any vertical boundaries. In other words, only those neighboring aircraft that are members of the identified subset are considered for the filtered VSD.

The process 400 continues by generating and rendering an appropriate filtered VSD on the display element of the host aircraft (task 422). The visual characteristics and elements of this filtered VSD will be responsive or otherwise influenced by the image rendering display commands generated during task 420. The filtered VSD will include a number of graphical features, visual elements, and graphical representations that are intended for viewing by the pilot and/or other flight crew members. For example, the filtered VSD might include, without limitation, graphical representations of: the host aircraft; the neighboring aircraft located within the lateral boundaries; an altitude or flight level scale; and a lateral distance scale. Notably, the filtered VSD will be devoid of graphical representations of any neighboring aircraft that are located outside the display filter boundary.

Figure 5:
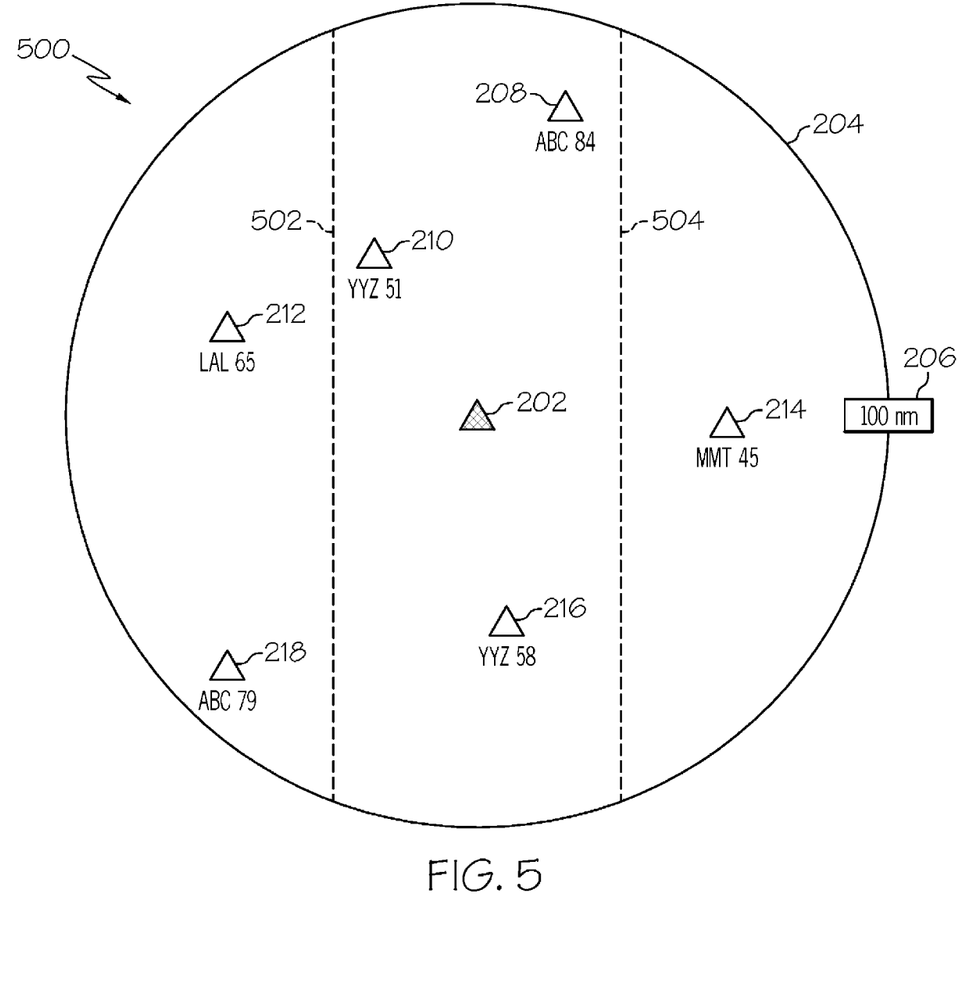
FIG. 5 is a schematic representation of an exemplary plan view display that depicts a host aircraft, surrounding aircraft traffic, and lateral display filtering boundaries.
Figure 6:
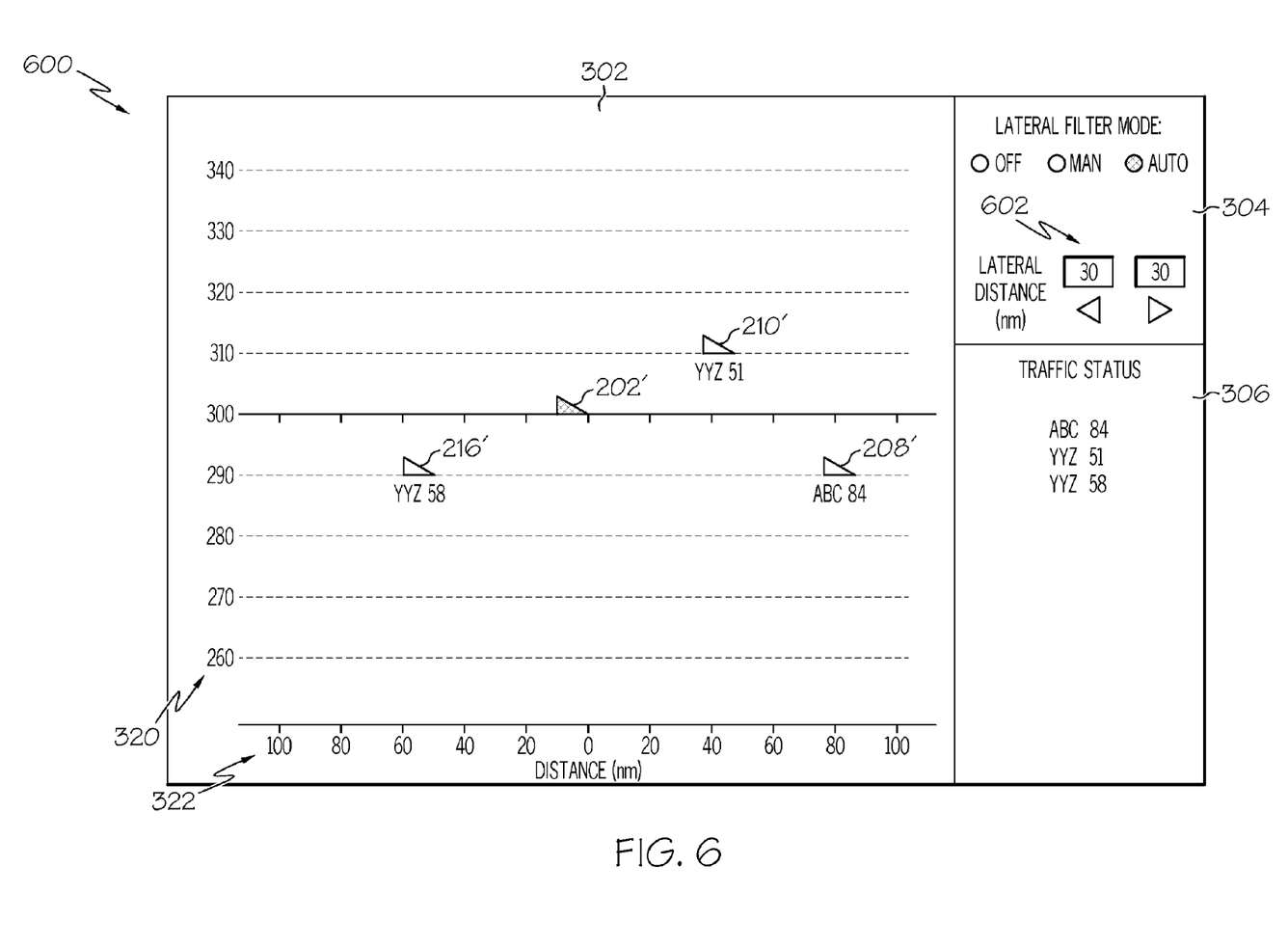
FIG. 6 is a schematic representation of an exemplary filtered VSD that corresponds to the plan view display shown in FIG. 5.

FIG. 5 and FIG. 6 illustrate one possible scenario where lateral display filtering is active. FIG. 5 is a schematic representation of an exemplary plan view display 500 that depicts a host aircraft, surrounding aircraft traffic, and lateral display filtering boundaries, and FIG. 6 is a schematic representation of an exemplary filtered VSD 600 that corresponds to the plan view display 500. Most of the features of the plan view display 500 are identical to those described above for the plan view display 200 of FIG. 2, and common features and elements will not be redundantly described here. In contrast to that depicted in FIG. 2, the plan view display 500 also includes graphical representations of the lateral boundaries, namely, a port side lateral boundary line 502 and a starboard side lateral boundary line 504. Although not always required, the lateral boundaries for this example are symmetrical relative to the host aircraft. In other words, the lateral distance from the host aircraft to the port side lateral boundary line 502 is equal to the lateral distance from the host aircraft to the starboard side lateral boundary line 504.

FIG. 5 illustrates how some (but not all) of the neighboring aircraft are located between the two lateral boundary lines 502, 504. Specifically, the neighboring aircraft 208, 210, 216 are located within the lateral display filtering boundaries. In contrast, the neighboring aircraft 212, 214, 218 are located outside the area defined between the lateral boundary lines 502, 504. In practice, the plan view display 500 may be suitably generated such that all of the neighboring aircraft 208, 210, 212, 214, 216, 218 are displayed, regardless of their position relative to the lateral boundary lines 502, 504.

Referring to FIG. 6, most of the features of the filtered VSD 600 are identical to those described above for the VSD 300 of FIG. 3, and common features and elements will not be redundantly described here. In contrast to that depicted in FIG. 2, the VSD 600 does not include graphical representations of any neighboring aircraft located outside of the lateral display filtering boundaries. Accordingly, the neighboring aircraft 212, 214, 218 (shown in FIG. 5) are not displayed on the VSD 600, and only the neighboring aircraft 208', 210', 216' are rendered on the VSD 600. Compared to the VSD 300, which includes visual representations of all the neighboring aircraft, the VSD 600 is less cluttered and easier to read. In FIG. 6, the data entry and notification area 304 indicates that the automatic lateral filter mode is active. Moreover, the VSD 600 includes indicia 602 of the display filter boundaries. For this example, the lateral boundaries are both 30 nautical miles, relative to the host aircraft. It should be appreciated that this indicia 602 could be rendered elsewhere on the VSD 600.

With reference again to FIG. 4, if query task 414 determines that the manual filtering mode has been selected, then the process 400 may proceed by obtaining or otherwise receiving user-entered data (task 416) that defines or is indicative of the display filter boundary, the display filtering criteria, the lateral boundary values, or the like. This example assumes that the user-entered data indicates a first lateral boundary for the port side of the host aircraft, and a second lateral boundary for the starboard side of the host aircraft. Accommodating individual lateral boundary values in this manner enables the display system to generate a filtered VSD using asymmetric lateral boundaries, relative to the host aircraft.

The process 400 can then proceed to calculate or otherwise obtain the lateral boundaries to be used for rendering the filtered VSD (task 426). These lateral boundaries may be calculated from or based upon the user-entered lateral boundary values. Indeed, the lateral boundaries obtained during task 426 may be identical to the user-entered data. After the appropriate lateral boundaries are determined, the process 400 may proceed to task 418 and continue to generate and render the filtered VSD in the manner described previously.

The manual mode allows the user to customize the display filtering characteristics of the VSD to some extent. The display system might allow the user to enter any boundary value, or it may provide specific boundary values (in fixed increments or otherwise) from which the user may select for use with the VSD at a given time. In certain embodiments, the display system places upper and lower limits on the user-entered boundary values (e.g., a user-entered boundary value must be within the range of 10-60 nautical miles, or within ten to ninety percent of the maximum lateral range). For this particular example, the manual mode enables the user to set a port side lateral boundary value and a starboard side lateral boundary value, independently of one another. Accordingly, the filtered VSD could be generated using symmetrical lateral boundaries (see FIG. 5 and FIG. 6) or using asymmetrical lateral boundaries.

Figure 7:
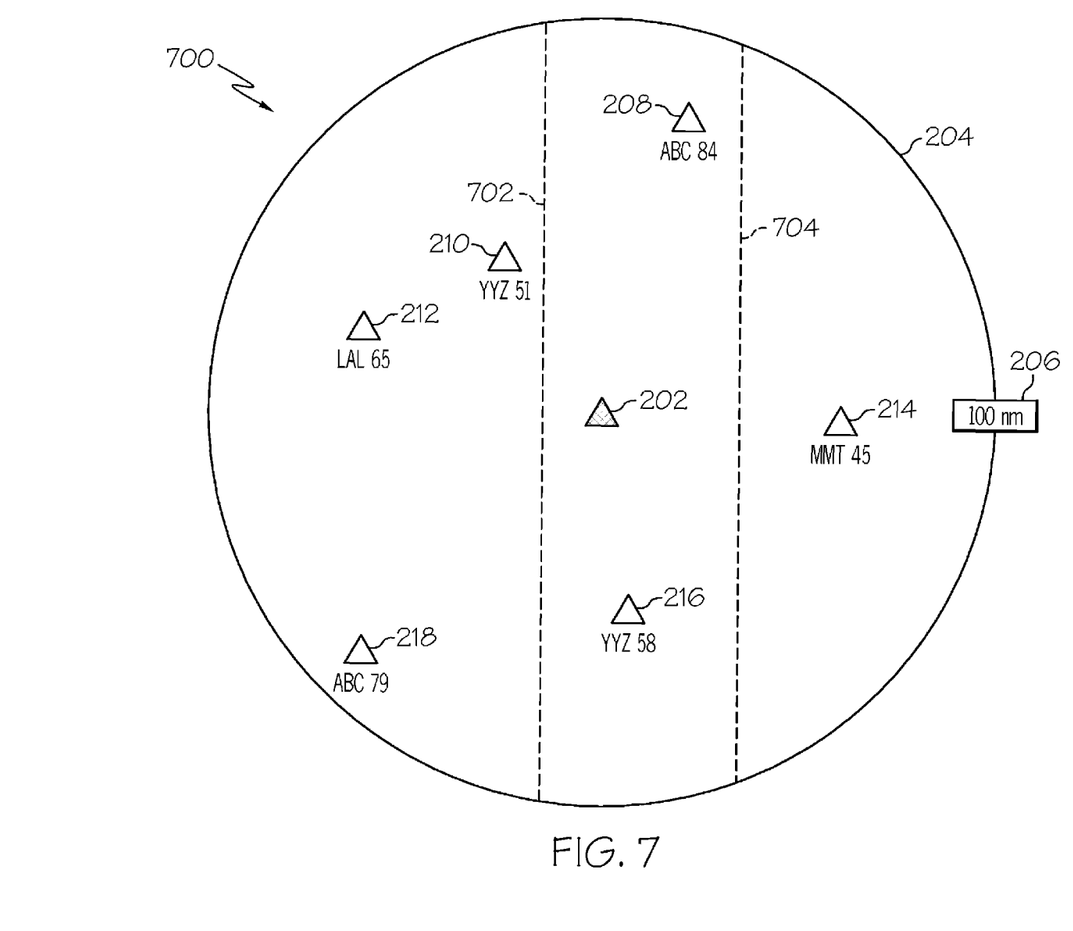
FIG. 7 is a schematic representation of an exemplary plan view display that depicts a host aircraft, surrounding aircraft traffic, and asymmetric lateral display filtering boundaries.
Figure 8:
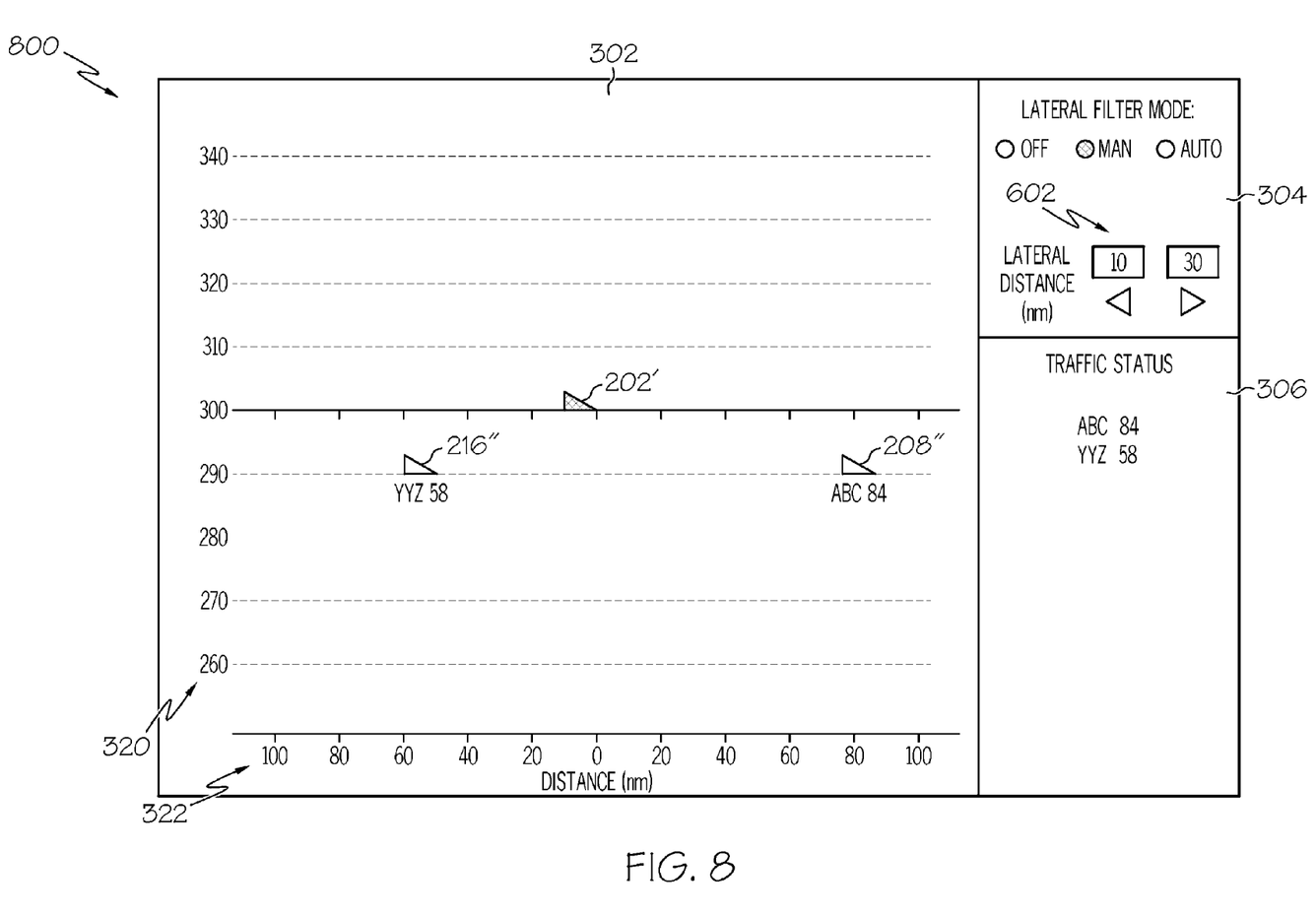
FIG. 8 is a schematic representation of an exemplary filtered VSD that corresponds to the plan view display shown in FIG. 7.

FIG. 7 and FIG. 8 illustrate another scenario where lateral display filtering is active; for this example, the manual filtering display mode has been selected and asymmetrical lateral boundaries have been set. FIG. 7 is a schematic representation of an exemplary plan view display 700 that depicts the host aircraft, surrounding aircraft traffic, and asymmetric lateral display filtering boundaries, and FIG. 8 is a schematic representation of an exemplary filtered VSD 800 that corresponds to the plan view display 700 shown in FIG. 7. Most of the features of the plan view display 700 are identical to those described above for the plan view display 200 of FIG. 2, some features of the plan view display 700 are similar to those described above for the plan view display 500 of FIG. 5, and common features and elements will not be redundantly described here. In contrast to that depicted in FIG. 2, the plan view display 700 also includes graphical representations of the asymmetric lateral boundaries, namely, a port side lateral boundary line 702 and a starboard side lateral boundary line 704. As is apparent from FIG. 7, the lateral distance from the host aircraft 202 to the port side lateral boundary line 702 is less than the lateral distance from the host aircraft 202 to the starboard side lateral boundary line 704.

Referring to FIG. 8, most of the features of the filtered VSD 800 are identical to those described above for the VSD 300 of FIG. 3, some of the features of the filtered VSD 800 are similar to those described above for the VSD 600 of FIG. 6, and common features and elements will not be redundantly described here. In contrast to that depicted in FIG. 2, the VSD 800 does not include graphical representations of any neighboring aircraft located outside of the lateral display filtering boundaries. Accordingly, the neighboring aircraft 210, 212, 214, 218 (shown in FIG. 5) are not displayed on the VSD 600, and only the neighboring aircraft 208", 216" are rendered on the VSD 800. Compared to the VSD 600 (which uses symmetrical lateral boundaries), the shorter port side lateral boundary used to generate the VSD 800 results in the removal of the neighboring aircraft 210 from the VSD 800. As shown in FIG. 7, the neighboring aircraft 210 is located beyond the port side lateral boundary 702 and, therefore, the VSD 800 does not include a graphical representation of that aircraft. In FIG. 8, the data entry and notification area 304 indicates that the manual lateral filter mode is active. Moreover, the VSD 800 includes indicia 602 of the individual lateral boundaries.

Referring again to the flow chart of FIG. 4, if it is time to refresh the VSD (query task 428), then the process 400 returns to task 402 to obtain updated data and refresh the display element in response to the updated data. Thus, the content of the rendered VSD is dynamically updated as the host aircraft continues its flight path.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for displaying aircraft traffic information on a display element of a host aircraft, the method comprising:
    obtaining with instrumentation current flight status data of the host aircraft and current flight status data of neighboring aircraft located within a designated range relative to the host aircraft;
    obtaining with a processor a lateral display filter boundary relative to the host aircraft, the lateral display filter boundary comprising a first lateral boundary for a port side of the host aircraft and a second lateral boundary for a starboard side of the host aircraft, with each lateral boundary intersecting the designated range and dividing the designated range into a near portion between the lateral boundaries and a far portion beyond each respective lateral boundary;
    generating with the processor, based upon the current flight status data of the host aircraft and the current flight status data of the neighboring aircraft located within the designated range, image rendering commands corresponding to a plan view display for the host aircraft, the plan view display comprising graphical representations of the host aircraft and the neighboring aircraft located within the designated range;
    rendering the plan view display on the display element;
    analyzing with the processor the current flight status data of the neighboring aircraft located within the designated range to identify neighboring aircraft located in the near portion and in the far portion;
    generating with the processor, based upon the current flight status data of the host aircraft and the current flight status data of the neighboring aircraft located in the near portion, image rendering commands corresponding to a vertical situation display (VSD) for the host aircraft, the VSD comprising graphical representations of the host aircraft and the neighboring aircraft located within the near portion, and the VSD excluding graphical representations of neighboring aircraft located in the far portion; and
    rendering the VSD on the display element.

2. The method of claim 1, further comprising receiving user-entered data that defines the display filter boundary relative to the host aircraft.

3. The method of claim 2, wherein the user-entered data indicates the first lateral boundary for the port side of the host aircraft, and the second lateral boundary for the starboard side of the host aircraft.

4. The method of claim 2, wherein the lateral boundaries are asymmetric relative to the host aircraft.

5. The method of claim 1, wherein the VSD further comprises indicia of the display filter boundary and the plan view display further comprises indicia of the display filter boundary.

6. The method of claim 1, further comprising calculating the display filter boundary as a function of the designated range.

7. The method of claim 6, wherein the calculating step calculates the display filter boundary as a percentage of the designated range.

8. A display system for a host aircraft, the display system comprising:
    instrumentation configured to obtain aircraft data comprising current flight status data of the host aircraft and current flight status data of neighboring aircraft located within a designated range relative to the host aircraft;

a processor configured to obtain a lateral display filter boundary relative to the host aircraft, the lateral display filter boundary comprising a first lateral boundary for a port side of the host aircraft and a second lateral boundary for a starboard side of the host aircraft, with each lateral boundary intersecting the designated range and dividing the designated range into a near portion between the lateral boundaries and a far portion beyond each respective lateral boundary;

a processor coupled to the instrumentation, the processor being configured to process and filter the aircraft data with a display filter boundary using lateral boundary criteria for the host aircraft, to identify a proper subset of the neighboring aircraft within the display filter boundary, and the processor being configured to generate image rendering display commands based upon the current flight status data of the host aircraft and based upon the current flight status data of neighboring aircraft included within the designated range and neighboring aircraft in the proper subset within the display filter boundary; and a display element coupled to the processor and configured to receive the image rendering display commands and, in response thereto, to render a plan view display that includes graphical representations of the host aircraft, the display filter boundary, and each neighboring aircraft located within the designated range, and to render a vertical situation display (VSD) that includes graphical representations of the host aircraft and each neighboring aircraft included the proper subset within the display filter boundary.

9. The display system of claim 8, further comprising a user interface configured to obtain user-entered data associated with the lateral boundary criteria.

10. The display system of claim 9, wherein the user interface is a graphical user interface rendered on the display element.

11. The display system of claim 9, wherein the user-entered data includes a first lateral boundary for a port side of the host aircraft, and a second lateral boundary for a starboard side of the host aircraft.

12. The display system of claim 8, wherein the processor calculates the lateral boundary criteria as a function of a user-entered lateral range relative to the host aircraft.

13. The display system of claim 8, wherein the instrumentation comprises an aircraft-to-aircraft data communication module configured to receive the current flight status data of the neighboring aircraft.

14. A method for displaying aircraft traffic information on a display element of a host aircraft, the method comprising:
    obtaining with instrumentation current flight status data of the host aircraft and current flight status data of neighboring aircraft located within a designated range relative to the host aircraft;
    receiving with the processor a user command that indicates an activation status of a lateral filter display mode;
    when the user command indicates activation of the lateral filter display mode:
        filtering with the processor the current flight status data of the neighboring aircraft, using lateral filtering criteria for the host aircraft, to identify a proper subset of the neighboring aircraft;
        generating with a processor, based upon the current flight status data of the host aircraft and the current flight status data of the neighboring aircraft located within the designated range, image rendering commands corresponding to a plan view display for the host aircraft, the plan view display comprising graphical representations of the designated range, the host aircraft and the neighboring aircraft located within the designated range, a first lateral boundary for a port side of the host aircraft intersecting the designated range, and a second lateral boundary for a starboard side of the host aircraft intersecting the designated range;
        rendering the plan view display on the display element;
        generating with the processor first image rendering display commands based upon the current flight status data of the host aircraft and based upon the current flight status data of neighboring aircraft included in the proper subset; and
        rendering a filtered vertical situation display (VSD) in response to the first image rendering display commands; and
    when the user command indicates deactivation of the lateral filter display mode:
        generating with the processor second image rendering display commands based upon the current flight status data of the host aircraft and based upon the current flight status data of all the neighboring aircraft; and
        rendering an unfiltered VSD in response to the second image rendering display commands.

15. The method of claim 14, further comprising:
    obtaining a lateral range for the host aircraft wherein the neighboring aircraft are located within the lateral range; and
    calculating the first lateral boundary and the second lateral boundary relative to the host aircraft, the lateral boundaries residing within the lateral range, wherein the lateral filtering criteria includes the lateral boundaries.

16. The method of claim 15, wherein the filtered VSD includes graphical representations of the neighboring aircraft located within the lateral boundaries, and the filtered VSD is devoid of graphical representations of any neighboring aircraft located outside the lateral boundaries.

17. The method of claim 15, wherein the unfiltered VSD includes graphical representations of all the neighboring aircraft located within the lateral range.

18. The method of claim 15, wherein the lateral boundaries are calculated as a function of the lateral range.

19. The method of claim 14, further comprising obtaining user-entered data associated with the lateral filtering criteria.

20. The method of claim 19, wherein the user-entered data indicates the lateral boundaries are asymmetric relative to the host aircraft.

* * * * *